United States Patent [19]

Swerdlow

[11] 4,409,285

[45] Oct. 11, 1983

[54] SURFACE-MODIFYING COATING COMPOSITIONS

[75] Inventor: Martin S. Swerdlow, New Barnet, England

[73] Assignee: Imperial Chemical Industries PLC, London, England

[21] Appl. No.: 317,851

[22] Filed: Nov. 3, 1981

[30] Foreign Application Priority Data

Nov. 10, 1980 [GB] United Kingdom ............... 8036086

[51] Int. Cl.$^3$ ..................... A32B 5/22; A32B 13/12
[52] U.S. Cl. ................. 428/332; 428/404; 428/483; 428/451; 428/329; 428/910; 428/918; 428/913; 428/331; 428/432; 428/441; 428/442; 428/428; 428/518; 428/323; 106/13; 427/164; 47/29
[58] Field of Search ............. 428/323, 331, 332, 329, 428/404, 483, 451, 910, 918, 913

[56] References Cited

U.S. PATENT DOCUMENTS

| | | | |
|---|---|---|---|
| 1,992,176 | 2/1935 | Benner | 428/329 |
| 3,115,420 | 12/1963 | Centa et al. | 428/483 X |
| 4,197,230 | 4/1980 | Baney et al. | 260/292 M |
| 4,242,396 | 12/1980 | Wilson et al. | 428/331 X |

OTHER PUBLICATIONS

JP-A-51-006193, Translation, Okawa et al., Japanese Application, Publication Apr. 28, 1980.

*Primary Examiner*—P. Ives
*Attorney, Agent, or Firm*—Cushman, Darby & Cushman

[57] ABSTRACT

Coating compositions suitable for application to optical surfaces to reduce surface misting and light reflection without creating haze comprise:

(a) an inorganic particulate component selected from colloidal silica particles, colloidal alumina particles, or a mixture thereof wherein the silica or alumina particles have a small particle size represented by an average particle size in the range 7 to 50 nm and the particles comprise 0.5 to 2.5% weight/volume of the total composition;

(b) another inorganic particulate component also selected from colloidal silica particles, colloidal alumina particles, or a mixture thereof wherein the silica and alumina particles have a large particle size represented by an average particle size in the range 75 to 150 nm and the particles comprise 0.2 to 1.0% weight/volume of the total composition;

(c) 0.1 to 1.0% weight/volume of a polymeric binder; and (d) a volatile liquid medium.

The coating compositions provide especially beneficial properties when applied to thermoplastic films and sheets, such as polyethylene terephthalate films. Such films are suitable as coverings or claddings for horticultural growing houses, cold frames and cloches.

1 Claim, No Drawings

SURFACE-MODIFYING COATING COMPOSITIONS

The present invention relates to a surface-modifying coating composition, a method for applying the composition to a surface of an article and the coated article.

It is well known that droplets of water condense from a humid atmosphere onto a cool surface. Such condensation or surface misting upon the surface of a transparent sheet, e.g. of a glass window or a glass or plastics film or sheet covering of a horticultural growing house, not only impairs vision through the sheet but also reduces the amount of light transmitted through it thereby retarding the growth of plants in the growing house.

Furthermore, light incident upon the surface of a light-transmitting material is subject to specular reflection. Such reflection diminishes the amount of incident light transmitted through the material. In the case of coverings for horticultural growing houses, this reduction in transmitted light also limits the amount of light available for plant growth.

Light reflection from surfaces can also obscure matter viewed through the surface, e.g. television screen guards and glass coverings over paintings or other exhibits.

According to the present invention there is provided a coating composition suitable for application to optical surfaces and which functions to reduce or eliminate the undesirable effects of surface misting and light reflection.

It is also an important characteristic of the coating composition of the invention that there should be no undue increase in haziness and translucency.

According to the present invention, a coating composition comprises:
  (a) an inorganic particulate component selected from colloidal silica particles, colloidal alumina particles, or a mixture thereof wherein the silica or alumina particles have a small particle size represented by an average particle size in the range 7 to 50 nm and the particles comprise 0.5 to 2.5% weight/volume of the total composition;
  (b) another inorganic particulate component also selected from colloidal silica particles, colloidal alumina particles, or a mixture thereof wherein the silica and alumina particles have a large particle size represented by an average particle size in the range 75 to 150 nm and the particles comprise 0.2 to 1.0% weight/volume of the total composition;
  (c) 0.1 to 1.0% weight/volume of a polymeric binder; and
  (d) a volatile liquid medium.

In this specification proportions expressed as % weight/volume are based upon amounts in grams of the respective component per 100 ml of composition. The amount of colloidal silica, colloidal alumina or mixture thereof is expressed in terms of the weight of the silica or alumina particles in the colloid, i.e. ignoring the aqueous medium and other components of the colloid.

Average particle sizes are expressed herein as the average size of the particles determined, on a weight basis, as the size of the particles in their greatest dimension. Sizes relate to the size of the primary non-agglomerated particles. Sizes may be measured by photon correlation spectroscopy.

According to another aspect of the invention, a method for modifying the surface of an article comprises applying a layer of the coating composition defined above to the surface of the article and drying the composition by permitting or causing the liquid medium to volatilise thereby providing a coated layer wherein at least some of the silica and/or alumina particles protrude from the surface of the polymeric binder.

The invention also relates to articles comprising a substrate, especially a glass sheet or film or sheet of a thermoplastics material, having a coated layer derived from the coating composition defined above, wherein at least some of the silica and/or alumina particles protrude from the surface of the polymeric binder in the coated layer.

The mixture of small and large particles in the coating composition is effective in improving the resistance of the treated surface to misting and also increases light transmission.

The preferred particles for use in the coating composition according to the invention are colloidal silica particles.

Amounts of the small particle component less than 0.5% weight/volume have no substantial effect upon the properties of the treated surface and amounts greater than 2.5% weight/volume lead to unstable compositions having a tendency for the particles to precipitate out of the composition.

Preferably, the small particles are present in the coating composition in an amount in the range 0.7 to 1.5% weight/volume, the most preferred range being 1.4 to 1.5% weight/volume. Average particle sizes in the range 20 to 35 nm are preferred. A colloidal silica suitable for inclusion as the small particle component is commercially available under the trade name 'Syton' X30 (Monsanto Ltd) and comprises 30 g of silica particles per 100 ml of aqueous colloid, the average particle size measured by the Applicants by photon correlation spectroscopy being approximately 32 nm.

In general, amounts of the large particles less than 0.2% weight/volume have no significant modifying effect upon surface misting properties and amounts exceeding 1.0% weight/volume introduce optical haziness.

The large particles are preferably present in an amount 0.5 to 0.85% weight/volume and especially in an amount 0.7 to 0.75% weight/volume and have a preferred average particle size in the range 90 to 130 nm. The large particles are preferable colloidal silica, a suitable material being that which is commercially avaiabe under the trade name 'Syton' W15 (Monsanto Ltd) and which comprises 15 g of silica particles per 100 ml of aqueous colloid, the average particle size measured by applicants by photon correlation spectroscopy being approximately 100 nm.

The polymeric binder may be chosen from any material known in the art which is capable of forming a continuous uniform film after the application of the coating composition to the surface of the article and drying and should preferably exhibit optical clarity and be strongly adherent to the surface of the article to be treated with the composition.

Suitable polymeric binders may be selected from the following:
  (i) "aminoplast" resins which can be prepared by the interaction of an amine or amide with an aldehyde, typically an alkoxylated condensation product of melamine and formaldehyde, e.g. hexamethoxymethylmelamine;

(ii) gelatin;

(iii) polyvinyl alcohol;

(iv) copolyesters derived from a sulpho derivative of a dicarboxylic acid such as sulphoterephthalic acid and/or sulphoisophthalic acid, e.g. the copolyester which is commercially available as "Eastman WD Size" and, by applicants' analysis, comprises an aqueous dispersion of 30% by weight of a copolyester of isophthalic acid, diethylene glycol and a sulpho derivative of a dicarboxylic acid such as sulphoterephthalic acid or a sulphoisophthalic acid;

(v) copolymers of acrylic acid and/or methacrylic acid and/or their lower alkyl (up to 6 carbon atoms) esters, e.g. copolymers of ethyl acrylate and methyl methacrylate, copolymers of methyl methacrylate/butyl acrylate/acrylic acid typically in the molar proportions 55/27/18% and 36/24/40%, copolymers containing hydrophilic functional groups such as copolymers of methyl methacrylate and methacrylic acid, and cross-linkable copolymers, e.g. comprising approximate molar proportions 48/48/4% respectively of ethyl acrylate/methyl methacrylate/acrylamide or methacrylamide;

(vi) copolymers of styrene with one or more ethylenically unsaturated comonomers such as maleic anhydride or itaconic acid, especially the copolymers described in British patent specification No. 1 540 067, e.g. a copolymer of 70/25/5 mole % respectively of styrene/butyl acrylate/itaconic acid; and (vii) polymers of vinyl halogenoesters such as those described in British patent specification No. 1 088 906 such as copolymers of vinyl mono-, di-, or trichloroacetate, particularly vinyl monochloroacetate, with 1 to 60 mole % of one or more other ethylenically unsaturated comonomers, e.g. selected from $\alpha,\beta$-unsaturated carboxylic acids, vinyl acetate and vinyl alcohol.

Copolymers of vinyl monochloroacetate with 30 to 60 mole % of vinyl acetate and/or vinyl alcohol are particularly suitable for use as the binder, e.g. a copolymer of 56 mole % vinyl monochloroacetate, 43 mole % vinyl alcohol and 1 mole % vinyl acetate.

The adhesion of coating compositions comprising the binders (ii) to (vi) described above to the surface of the article can be improved by the addition of known adhesion-promoting agents. The "aminoplast" resins (i) described above are particularly suitable for addition as adhesion-promoting agents. Such agents may be cross-linked if desired by the addition of a cross-linking catalyst and heating to initiate the cross-linking reaction after the application of the coating composition to the surface of the article.

It is desirable, especially in structures which are exposed to weathering such as horticultural growing houses, cold frames and cloches, that the applied coating layer should be resistant to degradation by ultraviolet light. Therefore the polymeric binder preferably has a high inherent resistance to such degradation. Alternatively, a conventional stabiliser against ultraviolet light degradation may be included in the coating composition. Other additives may also be included in the coating composition, e.g. conventional anti-static materials to improve the handling properties of the film and reduce its tendency to attract surface dirt.

Amounts of the polymeric binder in the coating composition less than 0.1% weight/volume provide inadequate adhesion to the surface of the article and hence poor coating durability whilst amounts exceeding 1.0% weight/volume tend to permit the particles to sink below the surface of the polymeric binder thereby diminishing the ability of the particles to combat surface misting and light reflection. The coating composition preferably includes 0.1 to 0.5% and most preferably 0.15 to 0.3% weight/volume of the polymeric binder.

The coating composition contains a volatile liquid medium which after drying leaves a continuous uniform coating. Aqueous media may be employed provided the polymeric binder is capable of film formation into a continuous uniform coating, generally when applied from an aqueous dispersion or latex.

Normally, however, the volatile liquid medium is a common organic solvent or a mixture of solvents in which the polymeric binder is soluble and is also such that the colloidal particles do not precipitate from the coating composition. Suitable organic solvents include methanol, acetone, ethanol, diacetone alcohol and 2-methoxy ethanol. Minor amounts of other solvents such as methylene chloride and methyl ethyl ketone may also be used in admixture with such solvents.

The coating compositions according to the invention are especially suitable for the treatment of articles having very smooth glossy surfaces, especially articles which are highly transparent. Accordingly, the compositions may be applied to the surfaces of articles made of glass, fibre-reinforced cured unsaturated polyester resins and thermoplastics materials and particularly to thermoplastics in film or sheet form suitable for use as coverings or claddings for horticultural growing houses, cold frames and cloches, e.g. homopolymers and copolymers of vinyl chloride, homopolymers and copolymers of olefins, such as ethylene and propylene, and synthetic linear polyesters which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-biphenyldicarboxylic acid, hexahydro-terephthalic acid or 1,2-bis-p-carboxyphenoxyethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol. A preferred thermoplastics material for covering or cladding horticultural growing houses, cold frames and cloches comprises polyethylene terephthalate in the form of a film which has been biaxially oriented by stretching in sequence in two mutually perpendicular directions typically at temperatures in the range 78° to 125° C. and preferably heat set typically at temperatures in the range 120° to 250° C., e.g. as described in British patent specification No. 838 708. In end uses in which the coated articles are exposed to weathering, polyesters having enhanced resistance to degradation by ultraviolet light may be used. Suitable polyesters are described in European patent application No. 79300896 (Publication No. 6686) and contain bis(hydroxyalkoxy)xanth-9-one residues in their molecular chains preferably together with residues of terephthalic acid and ethylene glycol.

Polyethylene terephthalate films are preferably pretreated and/or coated with an adhesion-promoting layer prior to the application of the coating composition, e.g. by coating with solutions of materials having a solvent or swelling action on the film such as halogenated phenols in common organic solvents. Solutions of p-chloro-m-cresol, 2,4-dichlorophenol, 2,4,6- or 2,4,5-trichlorophenol or 4-chlororesorcinol or mixtures of such materials in acetone or methanol are particularly effective as a pretreatment. If desired, the pretreating solution may also contain an adhesion-promoting polymer such as a partially hydrolysed copolymer of vinyl chloride and vinyl acetate.

As an alternative to, or in addition to, such a pretreatment a material having a swelling or solvent action upon the film may be incorporated into the coating composition of the invention itself.

In an alternative embodiment of the invention, polyethylene terephthalate films which are biaxially oriented by stretching sequentially in two directions may be coated with the coating composition, preferably in the form of an aqueous latex, either before stretching in the first direction of stretching or at a stage intermediate the stretching in the first direction and stretching in the second direction. It is preferred that the coating composition should be applied to the film between the two stretching operations. Such a sequence of stretching and coating is especiaaly preferred for the coating of polyethylene terephthalate films which are preferably firstly stretched in the longitudinal direction over a series of rotating rollers, coated with the coating composition and then stretched transversely in a stenter oven preferably followed by heat-setting.

The coating layer applied to the surface of the article from the coating composition according to the invention preferably has a dry coat weight in the range 0.5 to 4.0 mg/dm$^2$. Such dried coating layers preferably contain from 20 to 90% by weight of small particles and 5 to 65% by weight of the large particles (percentages being based upon the total weight of the layer). Particularly effective layers contain from 25 to 75% by weight of the small particles and 15 to 55% by weight of the large particles. The proportion of small particles preferably exceeds that of the large particles. The total amount of the particle mixture in the dry coating layer is preferably in the range 65 to 90% by weight of the layer.

Coating compositions applied to thermoplastics films, especially polyethylene terephthalate films, to provide a uniform continuous finished layer, preferably on both sides of the film, have been shown to provide an excellent combination of properties, namely low haze, and resistance to surface misting and light reflection, thereby enabling a high proportion of incident light to be transmitted through the coated film. It has surprisingly been found that the coated films have excellent antistatic properties as determined by a surface resistivity (measured at 20° C. and 60% relative humidity) in the range $1 \times 10^{11}$ to $1 \times 10^{12}$ ohms/square, thereby providing a resistance to the accumulation of dirt upon the surface of the film. Such films are especially beneficial as coverings or claddings for horticultural growing houses, cold frames and cloches since their high light transmission optimises the utilisation of available natural light to promote plant growth. The coated film may be utilised in such structures as the primary or sole covering or cladding material. Alternatively the film may be used in the construction of double or triple glazed assemblies either as the fundamental constructional material or in the form of a secondary glazing unit for addition to conventionally glazed structures.

Accordingly, the invention also relates to a horticultural growing house, cold frame or cloche having a covering or cladding comprising a thermoplastics sheet or film coated on one or both surfaces with a layer of a coating composition defined above.

The invention is further illustrated by the following examples wherein total luminous transmittance and haze were determined according to ASTM test D-1003-61. Surface resistivity was determined at 20° C. and 60% relative humidity. Surface misting properties were assessed by causing water vapour to condense upon the coated surfaces of the films prepared in the examples, the resistance to misting being graded subjectively as follows:

good—film remains clear and transparent without water droplet formation; condensed water deposits as a continuous film;

poor—film becomes opaque on account of a dense deposition of small sized condensed water droplets.

fair—film becomes hazy on account of deposition of larger sized condensed water droplets.

COMPARATIVE EXAMPLE 1

A conventional biaxially oriented and heat-set transparent film of polyethylene terephthalate of thickness 100 μm was subjected to an adhesion-promoting pretreatment by coating on both surfaces with a solution of 2.0 g of p-chloro-m-cresol in 100 ml of acetone to a wet coat weight of 100 mg/dm$^2$. The pretreatment coatings were dried for about 2 minutes at about 90° C.

The pretreated surfaces were coated with a coating composition of the following formulation:

| | |
|---|---|
| Colloidal silica (commercially available as 'Syton' X30 from Monsanto Ltd) | 26 ml |
| Copolymer of 56 mole % vinyl monochloroacetate/43 mole % vinyl alcohol/1 mole % vinyl acetate as polymeric binder | 2.3 g |
| Hexamethoxymethylmelamine (commercially available as 'Cymel' 300) | 0.02 g |
| p-toluene sulphonic acid | |
| A non-ionic condensate of nonyl phenol and ethylene oxide (commercially available as 'Lubrol' N13) | 2.56 g |
| Methanol | 576 ml |
| Acetone | 456 ml |
| Diacetone alcohol | 2.5 ml |
| Methylene chloride | 9.0 ml |

The coating composition was dried at about 75° C. for about 40 seconds followed by seasoning at a temperature in the range 100° to 120° C. for 2 to 5 minutes to provide a continuous finished coating layer of approximate dry coat weight 1.9 mg/dm$^2$ on each surface of the film.

The total luminous transmittance, haze and resistance to misting of the coated film were determined with the results shown in Table 2.

COMPARATIVE EXAMPLE 2

A conventional biaxially oriented and heat-set transparent film of polyethylene terephthalate 100 μm thick was pretreated on both surfaces with a solution of p-chloro-m-cresol as described in Comparative Example 1. The pretreated surfaces were then coated with a coating composition of the following formulation:

| | |
|---|---|
| Colloidal silica (commercially available as 'Syton' W15 from Monsanto Ltd) | 4.8 ml |
| Copolymer of 56 mole % vinyl monochloroacetate/43 mole % vinyl alcohol/1 mole % vinyl acetate as polymeric binder | 0.21 g |
| Hexamethoxymethylmelamine (commercially available as 'Cymel' 300) | 0.002 g |
| p-toluene sulphonic acid | 0.002 g |
| A non-ionic condensate of nonyl phenol and ethylene oxide (commercially available as 'Lubrol' N13) | 0.24 g |
| Methanol | 51.0 ml |
| Acetone | 42.5 ml |
| Diacetone alcohol | 0.3 ml |
| Methylene chloride | 0.9 ml |

The coating composition was dried and seasoned to a dry coat weight on each surface of the film of about 1.9 mg/dm$^2$ as described in Comparative Example 1. The total luminous transmittance, haze and resistance to misting of the coated film were assessed with the results shown in Table 2.

COMPARATIVE EXAMPLE 3

A further sample of the biaxially oriented and heat-set transparent film of polyethylene terephthalate used in Comparative Example 1 was assessed for total luminous transmittance, haze and resistance to misting in the absence of any pretreatment and coating as described therein, with the results shown in Table 2.

EXAMPLES 1 AND 2

Comparative Example 1 was repeated to apply alternative coating compositions containing a mixture of colloidal silicas having small and large average particle sizes, as follows:

TABLE 1

| | Example 1 | Example 2 |
|---|---|---|
| Colloidal silica (commercially available as 'Syton' X30 from Monsanto Ltd) | 13.0 ml | 25.5 ml |
| Colloidal silica (commercially available as 'Syton' W15 from Monsanto Ltd) | 13.0 ml | 13.0 ml |
| Copolymer of 56 mole % vinyl monochloroacetate/43 mole % vinyl alcohol/1 mole % vinyl acetate as polymeric binder | 1.15 g | 1.15 g |
| Hexamethoxymethylmelamine (commercially available as 'Cymel' 300) | 0.015 g | 0.015 g |
| p-toluene sulphonic acid | 0.015 g | 0.015 g |
| A non-ionic condensate of nonyl phenol and ethylene oxide (commercially available as 'Lubrol' N13) | 1.28 g | 1.28 g |
| Methanol | 286 ml | 286 ml |
| Acetone | 216 ml | 216 ml |
| Diacetone alcohol | 1.3 ml | 1.3 ml |
| Methylene chloride | 4.6 ml | 4.6 ml |

The dried and seasoned coating layer had an approximate dry coat weight of 1.9 mg/dm$^2$ on each surface of the film.

The total luminous transmittance, haze, resistance to misting and surface resistivity of the films were determined with the results shown in Table 2.

TABLE 2

| Example | Total luminous transmittance | Haze | Resistance to misting | Surface Resistivity ohms/square |
|---|---|---|---|---|
| Comparative 1 | 95.3% | 3.0% | fair | — |
| Comparative 2 | 92.5% | 6.0% | fair | $4.5 \times 10^{12}$ |
| Comparative 3 | 87.8% | 1.1% | poor | $>10^{13}$ |
| 1 | 95.0% | 3.0% | good | $4.1 \times 10^{11}$ |
| 2 | 94.8% | 3.5% | good | $9 \times 10^{10}$ |

The plain uncoated film of Comparative Example 3 had a highly glossy surface leading to surface reflection of incident light and hence a poor total luminous transmittance of 87.8% and poor resistance to misting as indicated in Table 2. The film had a high degree of transparency as represented by the haze value 1.1% shown in Table 2.

Surface treatment with coating compositions containing small particles only in the case of Comparative Example 1 and large particles only in the case of Comparative Example 2 resulted in an improvement in light transmission accompanied by some degree of improvement in resistance to misting. However, the complete deposition of water droplets was not prevented with the consequence that surface misting or haziness was created by the water droplets. The coating used in Comparative Example 2 increased the haze value of the film to an unacceptable level of 6.0%.

However the incorporation of a mixture of small and large particles in the coating composition, as illustrated by Examples 1 and 2, results in an acceptable combination of properties. In particular the coated films had "good" resistance to misting and did not accumulate water droplets on their surfaces. These properties were combined with high light transmission and an acceptable level of haze.

EXAMPLES 3 AND 4

Examples 1 and 2 were repeated except that the polyethylene terephthalate film was replaced by a 100 μm thick film derived from a polyester containing ethylene terephthalate units and 1.5% by weight of residues of 3,6-bis(2-hydroxyethoxy)xanth-9-one. The film was made by the conventional conditions known and used for the production of biaxially oriented and heat-set films except that heat-setting was carried out at 165° C. The coated films had properties similar to those of Examples 1 and 2 shown in Table 2 and improved resistance to ultraviolet light degradation.

I claim:

1. An optical surface, on which the undesirable effects of surface misting and light reflection are reduced, which comprises a substrate having a coated layer comprising silica and/or alumina particles and a polymeric binder wherein at least some of the particles protrude from the surface of the polymeric in the coated layer, said particles comprising a small particle size component having an average particle size in the range 7 to 50 nm and present in an amount from 20 to 98% by weight and a large particle size component having an average particle size in the range 75 to 150 nm and present in an amount from 5 to 65% by weight.

* * * * *